United States Patent [19]

Lavin et al.

[11] Patent Number: 5,207,065
[45] Date of Patent: May 4, 1993

[54] SEPARATION OF GAS MIXTURES

[75] Inventors: John T. Lavin, Guildford; Thomas Rathbone, Farnham, both of England

[73] Assignee: The BOC Group, Inc., Windlesham, England

[21] Appl. No.: 768,138

[22] Filed: Sep. 30, 1991

[30] Foreign Application Priority Data

Oct. 2, 1990 [GB] United Kingdom ............... 9021435

[51] Int. Cl.⁵ .............................................. F25J 3/00
[52] U.S. Cl. .............................................. 62/11; 62/36;
165/166; 196/139; 202/198
[58] Field of Search ................... 62/36, 11; 196/139;
202/198; 165/166

[56] References Cited

U.S. PATENT DOCUMENTS

| | | | |
|---|---|---|---|
| 3,992,168 | 11/1976 | Toyama et al. | 62/36 |
| 4,208,198 | 6/1980 | Small | 62/9 |
| 4,671,813 | 6/1987 | Yoshino | 62/36 |
| 4,721,164 | 1/1988 | Woodward | 62/36 |
| 4,749,393 | 6/1988 | Rowles | 62/36 |

Primary Examiner—Ronald C. Capossela
Attorney, Agent, or Firm—David M. Rosenblum; Larry R. Cassett

[57] ABSTRACT

The present invention provises a method and apparatus for separating a gas mixture. In accordance therewith, the gas mixture is rectified in a dephlegmator. The dephlegmator has first and second sets of heat exchange passages which are in a heat exchange relationship with the gas mixture being rectified. A stream of a first heat exchange fluid is passed through a first of the set of heat exchange passages so as to condense some of the gas mixture. A stream of a second heat exchange fluid is sub-cooled by passage through a second set of the heat exchange passages.

9 Claims, 2 Drawing Sheets

SEPARATION OF GAS MIXTURES

BACKGROUND OF THE INVENTION

The invention relates to the separation of gas mixtures. It is particularly concerned with the separation of gas mixtures by dephlegmation, otherwise known as reflux condensation. Dephlegmation or reflux condensation is a method in which a gaseous mixture which is being separated by rectification is simultaneously heat exchanged with a fluid stream that is raised in temperature by the heat exchange and thereby condenses fluid being rectified to create a reflux flow for the rectification.

Dephlegmation has been used to separate ethylene from mixtures of hydrocarbons as is described by H. C. Rowles et al in "Ethylene recovery by cryogenic dephlegmation" see "Gas separation technology", 1989 pp 609 to 616 (Elsevier Science publishers). Dephlegmation has also been proposed for use in air separation. U.S. Pat. No. 2 963 872 discloses a process of producing oxygen-enriched air using dephlegmation. In this process, a conventional distillation column with trays is employed to separate the air into a first fluid enriched in oxygen and a second fluid enriched in nitrogen. The liquid phase of the first fluid is taken from the bottom of the distillation column and is passed through a valve so as to reduce its pressure. The resulting reduced pressure liquid is then passed downwardly through a set of heat exchange tubes located in the distillation column. Thus, some of the fluid being rectified in the distillation column is condensed thereby creating a reflux flow, while the liquid is itself evaporated and passes out of the heat exchange tubes for collection or use as a product. It is known in conventional air separation processes employing a rectification column to sub-cool the oxygen-enriched liquid stream over a similar temperature range to that spanned by the rectification column. There are a number of other cryogenic separation processes which also employ heat exchangers that operate over similar temperature ranges to that spanned by the rectification column. The method and apparatus according to the invention enables such heat exchange to be performed in the dephlegmator.

SUMMARY OF THE INVENTION

According to the present invention there is provided a method of separating a gas mixture by dephlegmation comprising rectifying the gas mixture while simultaneously heat exchanging it with a first stream of heat exchange fluid so as to condense some of the gas mixture and thereby to create a reflux flow for the rectification, and simultaneously heat exchanging the first stream with a second stream of heat exchange fluid, said second stream passing out of heat exchange relationship with the first stream as a sub-cooled liquid.

The invention also provides apparatus for separating a gas mixture comprising a dephlegmator adapted to rectify a gas mixture having first and second sets of heat exchange passages which in use are in heat exchange relationship with the gas mixture being rectified, whereby, in use, a stream of first heat exchange fluid is able to be passed through the first set of passages so as to condense some of the gas mixture being rectified and thereby to create a reflux flow for the rectification, and a stream of a second heat exchange fluid is able to be sub-cooled by passage through the second set of heat exchange passages.

The method and apparatus according to be invention are particularly suited for the separation of air to provide a product either enriched in nitrogen or enriched in oxygen. In air separation, the first and second streams of heat exchange fluid preferably both comprise a stream of liquid oxygen-enriched air.

Both streams of heat exchange fluid preferably exchange heat with all the different compositions of gas mixture being rectified. In the example of air separation, the second set of passages receive oxygen-enriched liquid air which is then sub-cooled by heat exchange with the air being rectified, is reduced in pressure by passage through a valve and is then returned countercurrently through the first set of passages.

Preferably, a third stream of heat exchange fluid is heat exchanged by passage through a third set of heat exchange passages with the second stream and the air being rectified. For example, nitrogen-enriched air which may be more than 99% pure nitrogen is superheated by passage through a third set of heat exchange passages in heat exchange relationship with the air being rectified. The stream of oxygen-enriched liquid air being sub-cooled is thus heat exchanged not only with the reduced pressure oxygen-enriched liquid stream but also with the nitrogen stream. In comparison with a dephlegmation process in which sub-cooling of the oxygen-enriched liquid stream is performed in a heat exchanger entirely separately from the dephlegmator, this enables a lower temperature to be achieved by the sub-cooling. It therefore becomes possible to rectify the air at a slightly lower pressure without detriment to the yield or purity of a product nitrogen or oxygen-enriched air stream. By the purity of an oxygen-enriched air stream is meant its oxygen concentration.

If the method and apparatus according to the invention is used to separate air, the air may be pre-treated in a conventional manner, that is to say it is purified by removal of constituents of relatively low volatility such as water vapour and carbon dioxide, and cooled in a heat exchanger by heat exchange with returning streams from the rectification.

The heat exchange passages of an apparatus according to the invention are preferably provided within a plate heat exchanger, one set of passages of such heat exchanger being adapted to rectify the gas mixture. Preferably, the set of passages that is used for the rectification of the gas mixture have fins in order to extend the surface area available for liquid-vapour contact enabling mass transfer to take place between the liquid phase and the vapour phase. The said second and third sets of heat exchange passages are also preferably provided with fins. The walls of the first set of said heat exchange passages may also be provided with fins. Alternatively, they may be provided with a porous coating adapted to enhance boiling. For an example of such passages see our European patent application EP-A-0 303 493.

BRIEF DESCRIPTION OF THE DRAWINGS

The method and apparatus according to the present invention will now be described by way of example with reference to the accompanying drawings, in which.

Like parts are indicated by the same reference numerals in the different Figures of the drawings.

DETAILED DESCRIPTION

Figure 1:
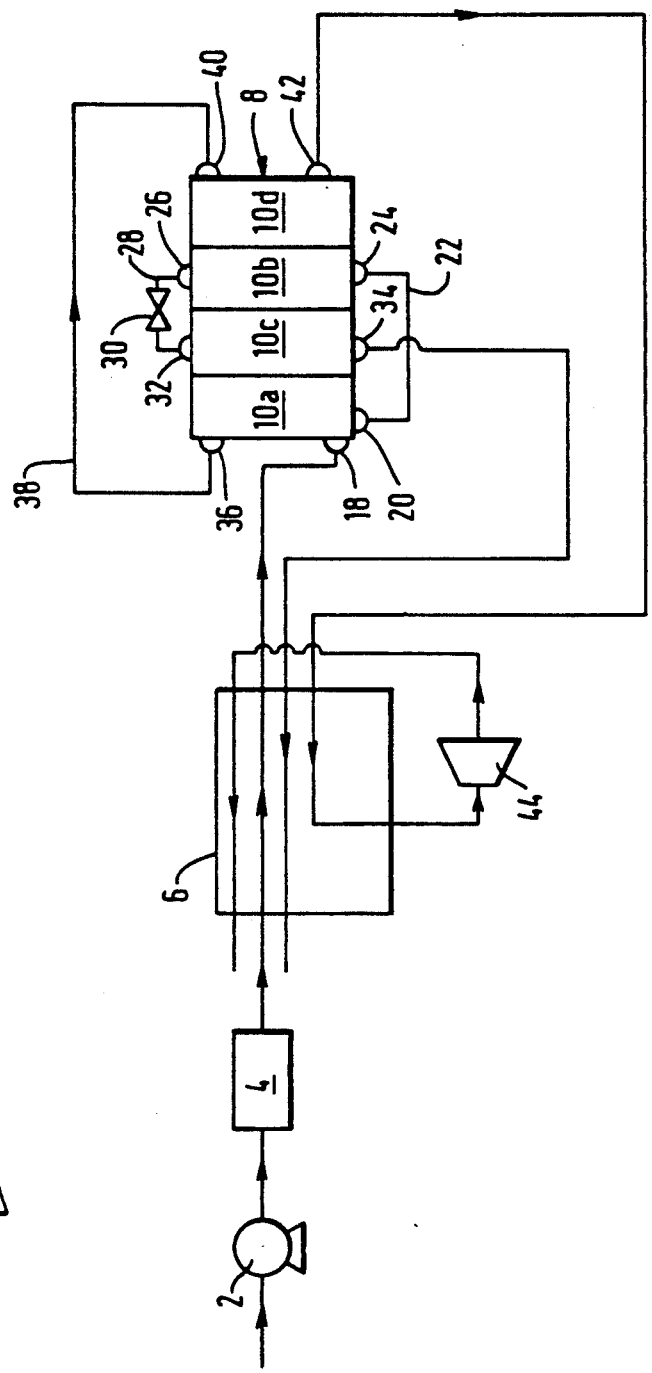
FIG. 1 is a schematic drawing of a first apparatus according to the invention for separating air.

Referring to FIG. 1 of the drawings, air is compressed in a compressor 2 typically to a pressure in the range of 2 to 3 atmospheres absolute. The air is then purified by means of a purification apparatus 4 which typically comprises a plurality of beds of adsorbent which selectively adsorbs carbon dioxide and water vapour from the incoming air. The construction and operation of such purification units are well known in the art. Typically, a desiccant such as alumina is used to remove water vapour from the incoming air and a molecular sieve adsorbent such as zeolite is used to remove carbon dioxide from the air. The beds may be operated out of sequence with one another such that while some beds are being used to purify the air, the remaining beds are being regenerated typically by means of a stream of hot gas. The purified air is then passaged through a main heat exchanger 6 in which it is cooled by countercurrent heat exchange with returning streams to a temperature suitable for its separation by rectification (e.g. to its saturation temperature).

Figure 3:
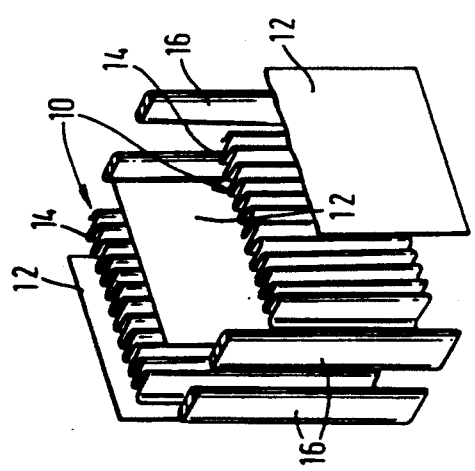
FIG. 3 is a schematic exploded perspective view, partially cut away, of two passages of the dephlegmator shown in FIGS. 1 and 2.
Figure 2:
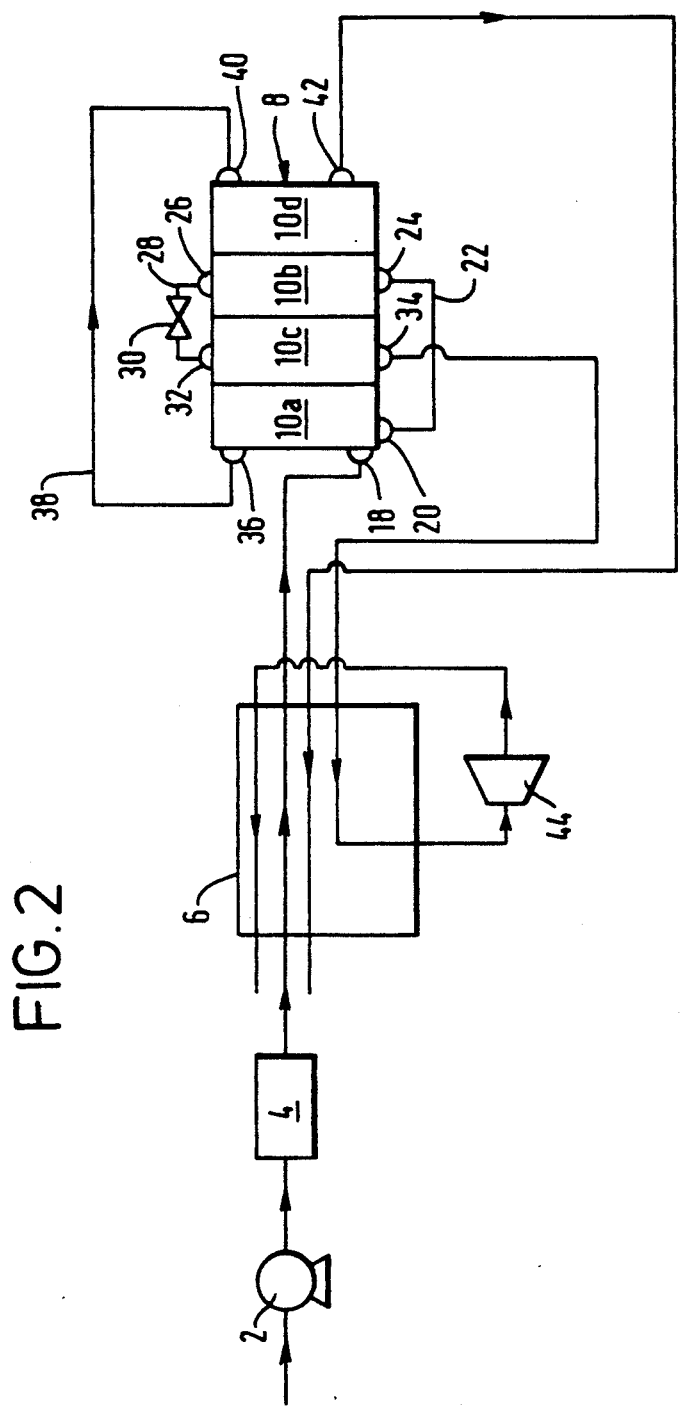
FIG. 2 is a schematic circuit diagram of a second apparatus for separating air in accordance with the invention.

The cooled air stream is then introduced into a dephlegmator 8. The dephlegmator 8 takes the form of an aluminium plate-fin brazed heat exchanger in which some of the passages 10 defined between the plates are dedicated to the rectification of the air. A typical construction of the passages through the dephlegmator 8 is illustrated schematically in FIG. 3 of the drawings. Two passages 10 are shown defined between aluminium plates 12. The passages 19 are each provided with a secondary finned surface to enhance heat transfer. Each such finned surface takes the form of a corrugated sheet 14 of metal with the corrugations running vertically. In the rectification passages, the finning provides an enhanced surface for the downward flow of condensate and thus provides a greater surface area for mass transfer between a descending liquid phase and an ascending vapour phase. As shown in FIG. 3, sealing bars 16 are provided at the sides of the array of plates 12. For ease of illustration, fluid distributors and collectors associated with the passages 10 are now shown in FIG. 3. Similarly, sealing bars at the top and bottom of each such passage are also omitted from FIG. 3.

The dephlegmator 8 comprises a multiplicity of such vertical passages 10. The passages 10 are in heat exchange relationship with one another along their entire extent. In the dephlegmator 8 there are four different sets of passages 10. These sets are illustrated schematically by the letters a to d in FIG. 1 of the drawings. Passages 10a are used for rectification of the incoming air. The air enters the passages 10a at the bottom thereof via a header 18 and a distributor (not shown). As the air ascends the passages 10a so it makes intimate contact with a falling film of liquid condensate on the fins 12 (see FIG. 3). Mass transfer takes place between the ascending vapour and the falling liquid with there being a net transfer of the least volatile constituent of the air, that is oxygen, from the vapour phase to the liquid phase. Accordingly, as in a conventional rectification column, the ascending vapour phase becomes progressively richer in nitrogen and the descending liquid phase progressively richer in oxygen.

An oxygen-enriched liquid typically containing from 30 to 60% by volume of oxygen flows under gravity out of the bottom of the passages 10a via the aforesaid distributor (not shown) (which thus needs to cope with a 2-phase flow keeping the liquid oxygen separate from the incoming air) into a header 20 form which if flows via a conduit 22 into a header 24 which via another distributor (now shown) supplies a stream of the oxygen-rich liquid to the bottom of each passage 10b. The liquid flows upwardly through the passages 10b being progressively lowered in temperature during its ascent. If necessary, a pump (not shown) may be operated intermediate the passages 10a and 10b to create the necessary flow. The liquid is therefore sub-cooled, that is to say it is cooled below its saturation temperature at the prevailing pressure. The resulting sub-cooled oxygen-enriched liquid air leaves the top of the passages 10b and flows into a header 26 via another distributor (not shown). The liquid then flows along conduit 28 in which a Joule-Thomson valve 30 is disposed. The effect of the Joule-Thomson valve 30 is to reduce the pressure to which the liquid air stream is subjected, there being in consequence a reduction in the temperature of the stream as it flows through the valve 30. The stream of oxygen-enriched liquid air, thus reduced further in temperature, flows into another header 32 of the dephlegmator 8 from which it enters the top of passages 10c via another distributor (not shown).

A film of oxygen-enriched liquid air thus flows down each passage 10c under gravity. It is accordingly raised in temperature by heat exchange with fluid being cooled in the dephlegmator 8. There is a point in its descent of each passage 10c where the liquid requires a temperature sufficient for it to begin to boil. The liquid oxygen-enriched air may be fully vaporised in the passages 10c and the resulting vapour withdrawn from the dephlegmator 8 via another distributor (not shown) and a header 34. The oxygen-enriched air stream then flows back through the heat exchanger 6 countercurrently to the incoming air stream and is thus warmed to ambient temperature. The oxygen-enriched air may then be supplied to a combustion or other process in which it can be used.

Considering again the operation of the passages 10a, a vapour enriched in nitrogen and typically containing at least 95% by volume of nitrogen, is withdrawn from the top of each such passage via another distributor (not shown) and another header 36. The nitrogen stream then flows into a conduit 38 which passes it to another header 40 which is used to pass the nitrogen vapour to the top of each passage 10c via another distributor (now shown). The nitrogen vapour enters the passages 10d substantially at its saturation temperature at the prevailing pressure and flows therethrough from top to bottom and is superheated, that is heated to a temperature above its saturation temperature, by heat exchange with the fluid being cooled in the dephlegmator 8. The resulting superheated nitrogen flows out of the passage 10d into another header 42 via another distributor (not shown) and then is returned a part of the way through the heater exchanger 6, flowing countercurrently to the incoming air stream. The nitrogen is withdrawn from the heat exchanger 6 at a temperature intermediate the cold end and warm end temperatures of the hat exchanger 6, is expanded in an expansion turbine 44 to a pressure at little above atmospheric pressure and to a temperature approximately equal to the cold end temperature of the heat exchanger 6. The resulting expanded nitrogen stream is then returned to the cold end of the heat exchanger 6 and flows therethrough to the warm end in countercurrent heat exchange relationship with the incoming air stream. The nitrogen stream is thus warmed to approximately ambient temperature and may be vented as a waste product. The expansion of the nitrogen stream in the turbine 44 provides the necessary refrigeration for efficient operation of the heat exchanger 6.

Considering again the operation of the dephlegmator 8, it is to be appreciated that the liquid oxygen-enriched air is sub-cooled in the passages 10b not only by heat exchange with the nitrogen being superheated in the passages 10d but also with the oxygen-enriched liquid air being heated and vaporised in passages 10c. In previous proposals for using dephlegmation in air separation cycles, the sub-cooling of the oxygen-enriched liquid air has been neglected. By employing the evaporating oxygen-enriched liquid air in the passages 10c as an additional heat exchange means for effecting the sub-cooling of the liquid oxygen-enriched air in the passages 10b, not only is the overall construction of the plant made simpler but also the oxygen-enriched liquid air can be sub-cooled to a lower temperature than if sub-cooling were performed in an entirely separate heat exchanger. As a result there is less flash gas created during the passage of the sub-cooled liquid through the Joule-Thomson valve 30. Accordingly, the temperature of this liquid after passage through the valve 30 will be slightly less than in the conventional process. This permits the rectifying passages 10a in the dephlegmator 8 to be operated at a slightly lower pressure and hence the feed air can be compressed in the compressor 2 to a slightly lower pressure, thus resulting in a power saving. For example, we calculate that in the process according to the invention the oxygen-enriched liquid air may leave the passages 10b at a temperature of 84.0K. Passage through the valve 30 will reduce the temperature to 82.59K with 1.4% by volume of the liquid being converted to flash gas. In consequence, the air pressure at the inlet to the passages 10a can be 2.12 atmospheres absolute. Suppose now that the passages 10b and 10d are provided in a separate heat exchanger from the dephlegmator 8. As a result, it will be possible to cool the oxygen-enriched liquid air from the rectification to a temperature of 86.7K. Expansion of thus sub-cooled liquid through a Joule-Thomson valve will lower its temperature to 82.67K with 3.9% by volume of the liquid being converted to flash. Accordingly, it is necessary to supply air to the rectification passages 10a of the dephlegmator 8 at a pressure of 2.13 atmospheres absolute, a slightly higher pressure than is needed when operating the apparatus shown in FIG. 1 of the drawings. This difference in operating pressure amounts to a power saving on air compression of 0.63%.

In operating the apparatus shown in FIG. 1, it is desirable to avoid flooding the rectification passages 10a of the dephlegmator 8. This need sets a maximum limit on the flow of air that the dephlegmator 8 can handle. If necessary, larger flows of air can be handled using a plurality of dephlegmators 8 in parallel with one another.

Other modifications mainly made to the apparatus shown in FIG. 1. For example, the purification apparatus 4 may be omitted and the heat exchanger 6 formed as a reversing heat exchanger to enable the impurities (water vapour and carbon dioxide to be removed). In another example, it may be desired to produce a nitrogen product. In this example, the oxygen-enriched air stream leaving the passages 10c of the dephlegmator 8 is treated as the waste stream and is the one that is withdrawn from an intermediate region of the heat exchanger 6, is expanded in the turbine 44 and is returned through the heat exchanger 6 from its cold end to the warm end, while the nitrogen stream passes straight through the heat exchanger 6 from its cold end to its warm end and is produced at ambient temperature. If it is desired to produce a relatively pure nitrogen stream, then the pressure to which the incoming air is compressed is typically higher than when producing an oxygen-enriched air stream as product.

In another modification, it is possible to form the heat exchanger 6 and the dephlegmator 8 as a unitary apparatus. In any such arrangement, it will be necessary to employ a distributor in the unitary heat exchanger to redistribute the fluid flow between that part which performs the function of the main heat exchanger 6 and that part which performs the function of the dephlegmator 8.

We claim:

1. A method of separating air by dephlegmation comprising: rectifying the air in a first set of heat exchange passages through which vapour flows from bottom to top to thereby form oxygen-enriched liquid and nitrogen gas therein: simultaneously passing a heat exchange fluid through a second set of heat exchange passages and heat exchanging the air with the stream of heat exchange fluid in a direction countercurrent to that of the flow of said vapor so as to condense some of the gas mixture and thereby create a reflux flow for the rectification of the air; forming said stream of heat exchange fluid by taking a stream of said oxygen-enriched liquid from the bottom of the first set of passages and subcooling the stream of the oxygen-enriched liquid by passing it in a direction cocurrent with that of the flow of said vapour through a third set of heat exchange passages in heat exchange relationship with the second set; and withdrawing a stream of the nitrogen gas from the top of the first set of passages.

2. The method claimed in claim 1, wherein the stream of oxygen-enriched liquid is passed through a valve to reduce its pressure after having been subcooled, but before passage to the second set of exchange passages.

3. The method claimed in claim 1, in which the air being rectified and the stream of the oxygen-enriched liquid while passing through the third set of heat exchange passages are also simultaneously heat exchanged with the stream of the nitrogen gas.

4. The method claimed in claim 1, in which a nitrogen or oxygen-enriched air product is produced.

5. A dephlegmation apparatus for separating air comprising: first and second sets of heat exchange passages in heat exchange relationship with one another; the first set of heat exchange passages configured to rectify air with vapor flowing from bottom to top and to thereby form an oxygen-enriched liquid and nitrogen gas; the second set of heat exchange passages connected to the first set of heat exchange passages so as to receive a stream of the oxygen-enriched liquid in a direction countercurrent to that of the flow of the vapour, thereby to condense some of the air being rectified and to create a reflux flow for the rectification of the air; and air third set of heat exchange passages in heat transfer relationship with the first and second sets of heat exchange passages; the third set of heat exchange passages connected to the first and second set of heat exchange passages such that the oxygen-enriched liquid flows from the first set of heat exchange passages through the third set of heat exchange passages in a cocurrent direction to that of the vapor flow and subcools upon its passage therethrough, and then flows into the second set of heat exchange passages.

6. The dephlegmation apparatus of claim 5, additionally comprising a fourth set of heat exchange passages in heat exchange relationship with the second and third sets of heat exchange passages, the fourth set of heat exchange passes connected to the first set of heat exchange passages so that a stream of the nitrogen gas passes in a heat exchange relationship with the stream of the oxygen-enriched liquid passing through the third set of heat exchange passages.

7. The dephlegmation apparatus as claimed in claim 6, in which said first, second, third and fourth sets of heat exchange passages are provided in a plate heat exchanger.

8. The dephlegmation apparatus as claimed in claim 7, in which all of the first, second, third, and fourth heat exchange passages have fins.

9. The dephlegmation apparatus as claimed in claim 5, in which outlet ends of the second set of heat exchange passages communicate with inlet ends of the first set of heat exchange passages through a pressure reducing valve.

* * * * *

UNITED STATES PATENT AND TRADEMARK OFFICE
CERTIFICATE OF CORRECTION

PATENT NO. : 5,207,065
DATED : May 4, 1993
INVENTOR(S) : John T. Lavin and Thomas Rathbone It is certified that error appears in the above-indentified patent and that said Letters Patent is hereby corrected as shown below:

Title page, Assignee: delete "The BOC Group, Inc." and insert
--The BOC Group plc--

Column 7, line 14: delete "passes" and insert --passages--

Signed and Sealed this

Fourth Day of January, 1994

Attest:

BRUCE LEHMAN

*Attesting Officer*     *Commissioner of Patents and Trademarks*